Nov. 24, 1931.  G. B. SHANKLIN  1,833,798
OIL FILLED LEAD COVERED ELECTRIC CABLES
Filed May 18, 1928
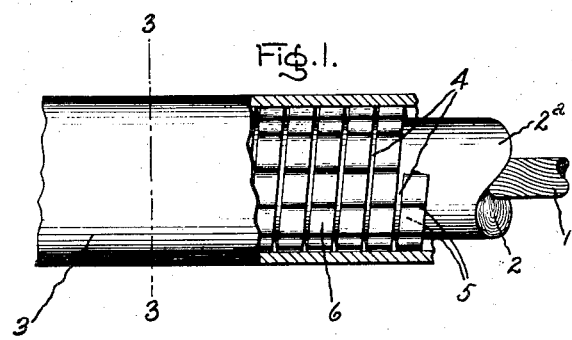
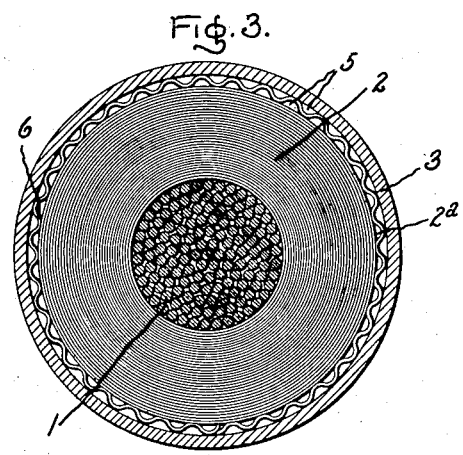
Inventor:
George B. Shanklin
by Charles E. Tullar
His Attorney.

Patented Nov. 24, 1931                                                          1,833,798

UNITED STATES PATENT OFFICE

GEORGE B. SHANKLIN, OF SCHENECTADY, NEW YORK, ASSIGNOR TO GENERAL ELECTRIC COMPANY, A CORPORATION OF NEW YORK

OIL-FILLED LEAD COVERED ELECTRIC CABLES

Application filed May 18, 1928. Serial No. 278,894.

The present invention relates to oil-filled, lead-covered electric cables and especially to such cables wherein grooves or passages are provided between the insulation and the inner surface of the lead sheath for the passage of the oil.

The object of my invention is to provide an improved construction and arrangement in a cable of this type, and for a consideration of what I believe to be novel and my invention, attention is directed to the accompanying description and the claims appended thereto.

In the drawings, Fig. 1 is a side view partly in section of an oil-filled, lead-covered electric cable embodying my invention; Fig. 2 is a perspective view of a corrugated metal strip used in the construction shown in Fig. 1, and Fig. 3 is a transverse, sectional view taken on line 3—3, Fig. 1.

Referring to the drawings, 1 indicates the electrical conductor of the cable which in the present instance is shown as comprising twisted strands of wire; 2 indicates the insulation wrapping which may be formed from paper or other suitable material, 2a indicates a thin metallic covering forming an electrostatic shield and 3 indicates the lead sheath.

In connection with a cable construction of this type it is known already to provide passages for oil between the outer surface of the insulation and the inner surface of the lead sheath such passages in some instances extending longitudinally of the cable and in some instances extending circumferentially or spirally thereof. My invention relates to a specific means whereby an improved arrangement of oil passages is provided possessing advantages over constructions heretofore used as hereinafter pointed out.

According to my invention, I provide between the outer surface of the insulation 2 and the inner surface of the lead sheath 3, means which provides circumferentially-extending grooves 4 connected to each other by longitudinally-extending passages 5. In accordance with the preferred form of my invention, these grooves or passages are formed by means of a corrugated strip 6 of suitable width, wound spirally around insulation 2, the turns being spaced to define a continuous spiral groove. Adjacent spiral grooves are connected to each other by the longitudinal passages formed due to the corrugated shape of the strip.

By the use of a construction whereby I provide circumferentially extending grooves connected by longitudinally-extending passages, I am enabled to utilize grooves of less depth than have heretofore been considered practical because due to the longitudinally-extending passages if the circumferentially-extending grooves become clogged at any point, it does not completely interrupt the flow of the oil. Heretofore, it has been considered necessary to make the grooves of sufficient width and depth that the likelihood of their becoming clogged was remote. By my invention I have overcome this difficulty with the result that in the construction of the cable I am enabled to make the grooves 4 shallower than heretofore, a thing which results in the saving of material both as to the thickness of the strip 6 and the overall diameter of the cable.

As is known, oil-filled cable of this type when installed, is provided with suitable containers termed "expansion tanks", into which the oil expands when the cable increases in temperature and from which oil flows into the cable when the oil contracts, due to decrease in temperature; and in this connection, it is important that the passages for the oil shall not become clogged. Should they become clogged, failure may occur. By my improved construction, the likelihood of the passages for the oil becoming clogged to an extent such as to prevent free expansion or contraction of the oil is remote because of the longitudinally-extending cross passages.

In accordance with the provisions of the patent statutes, I have described the principles of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. In an oil-filled electric cable, the combination of a conductor, insulation on the conductor, a lead sheath, and a spirally-wound corrugated strip located between the insulation and the sheath, the turns of the strip being spaced to define a spiral groove.

2. An oil filled cable comprising a conductor, a thick body of insulation solidly covering the conductor, a body of fluid for impregnating the insulation, a lead sheath, and a continuous strip helically wound around the insulation and having integral parts alternately engaging the insulation and the inner wall of the sheath to hold the conductor and sheath in spaced, concentric relation, said parts with the insulation and sheath defining relatively thin longitudinal passages for said fluid.

3. An oil filled cable comprising a conductor, a body of insulation smoothly and solidly covering the conductor, a body of fluid for impregnating the insulation, a lead sheath, and a single continuous strip helically wound around the insulation with a helical space between the adjacent turns and having integral and uniformly spaced parts alternately engaging the insulation and the inner wall of the sheath to hold them in spaced relation, said parts with the insulation and sheath defining a longitudinally extending passage communicating with said spaces between the turns.

In witness whereof, I have hereunto set my hand this 17th day of May, 1928.

GEORGE B. SHANKLIN.